United States Patent [19]

Nameda et al.

[11] Patent Number: 4,505,263
[45] Date of Patent: Mar. 19, 1985

[54] HEAT COLLECTOR

[75] Inventors: Naoyoshi Nameda; Yooji Surisawa; Yasunobu Nakamoto, all of Yokohama; Hideshi Sekiya, Tokyo, all of Japan

[73] Assignee: Tokyo Shibaura Denki Kabushiki Kaisha, Japan

[21] Appl. No.: 461,491

[22] Filed: Jan. 27, 1983

[30] Foreign Application Priority Data

Jan. 29, 1982 [JP] Japan .................................. 57-12787

[51] Int. Cl.³ .............................................. F24J 3/02
[52] U.S. Cl. .................................... 126/438; 126/424; 126/442; 126/443; 138/171; 138/140
[58] Field of Search ............... 126/438, 440, 443, 442, 126/424; 138/178, 171, 157, 103, 11, 177, 140, 143

[56] References Cited

U.S. PATENT DOCUMENTS

| 3,970,113 | 7/1976 | Guttinger et al. | 138/157 |
| 4,122,825 | 10/1978 | Slate | 126/121 |
| 4,178,913 | 12/1979 | Hutchison | 126/424 |
| 4,380,995 | 4/1983 | Robertson | 126/425 X |

FOREIGN PATENT DOCUMENTS

| 2649792 | 3/1978 | Fed. Rep. of Germany | 126/271 |
| 71766 | 6/1981 | Japan | 126/438 |

Primary Examiner—Larry Jones
Assistant Examiner—Carl D. Price
Attorney, Agent, or Firm—Cushman, Darby & Cushman

[57] ABSTRACT

A heat collector for a solar heat utilization system comprises a heat collecting pipe and a reflecting plate for focusing solar light on the pipe. This pipe has a first tubular portion for receiving solar light collected by the reflecting plate, and a second tubular portion for receiving direct solar light. The second portion has thermal expansion coefficient larger by a predetermined amount than that of the first portion, and thermally expands at the same rate as the first portion.

12 Claims, 7 Drawing Figures

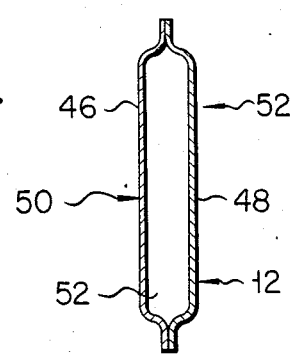
FIG. 4
FIG. 5
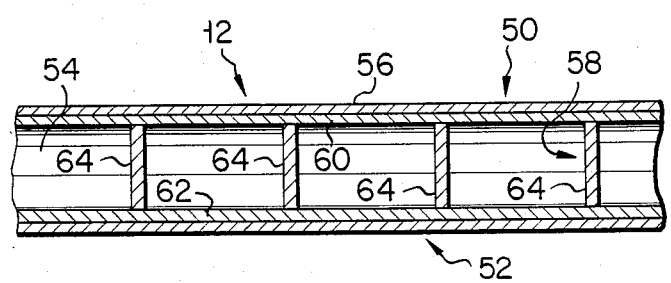
FIG. 6
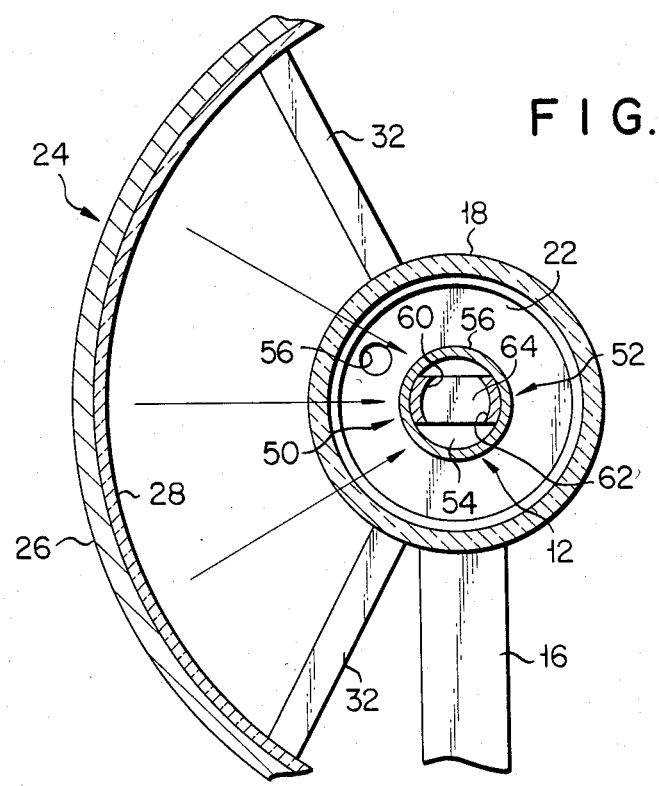

HEAT COLLECTOR

BACKGROUND OF THE INVENTION

The present invention relates to a heat collector for a solar heat utilization system.

A heat collector of this type generally has a heat collecting pipe and a reflecting plate which reflects solar light to focus the light on the pipe. The pipe is heated by the direct solar light and the light reflected by the reflecting plate, and the heat is transferred to a heating medium which flows in the pipe. The pipe is arranged in a vacuum glass cylinder, thereby preventing heat from radiating from the pipe. Since the light reflected from the reflecting plate is focused on the tubular wall of the pipe at the side of the plate, the temperature at that wall becomes higher than the wall at the side facing the sun, and a temperature difference of a predetermined rate is produced between the tubular walls at the side of the plate and at the side facing the sun. Expansion difference is produced by this temperature difference between the tubular walls of the pipe, with the result that the pipe bends. When the pipe is thus bent, the light reflected from the reflecting plate is not focused on the pipe, resulting in a decrease in the heat collecting efficiency of the heat collector. When the pipe is greatly bent, the pipe is forced against the inner surface of the glass cylinder, causing the cylinder to break.

SUMMARY OF THE INVENTION

The present invention has been made in consideration of this and has for its object to provide a heat collector which can prevent a heat collecting pipe from bending.

According to one aspect of the invention, there is provided a heat collector which comprises a heat collecting pipe and light focusing means for focusing solar light on the pipe. This pipe has a first tubular portion for receiving solar light focused by the light focusing means, and a second tubular portion for receiving direct solar light. The second portion has a thermal expansion coefficient larger by a predetermined rate than that of the first portion, and thermally expands at the same rate as the first portion.

According to the present invention, even if a temperature difference is produced between the first portion and the second portion of the pipe, both the first portion and the second portion thermally expand at the same rate. Therefore, bending of the pipe due to the temperature difference produced between the first portion and the second portion can be prevented, and a heat collector which has high heat collecting efficiency can be provided.

BRIEF DESCRIPTION OF THE DRAWINGS

FIGS. 1 to 3 show a heat collector according to a first embodiment of the present invention, wherein FIG. 1 is a perspective view of the heat collector, FIG. 2 is a longitudinal sectional view along the line II—II in FIG. 1, and FIG. 3 is a cross sectional view along the line III—III in FIG. 2;

FIG. 4 is a cross sectional view showing a modified example of a heat collecting pipe;

FIGS. 5 and 6 respectively are longitudinal and cross sectional views showing another modified example of the pipe.

DETAILED DESCRIPTION OF THE PREFERRED EMBODIMENT

An embodiment of a heat collector according to the present invention will be described in detail with reference to the accompanying drawings.

Figure 1:
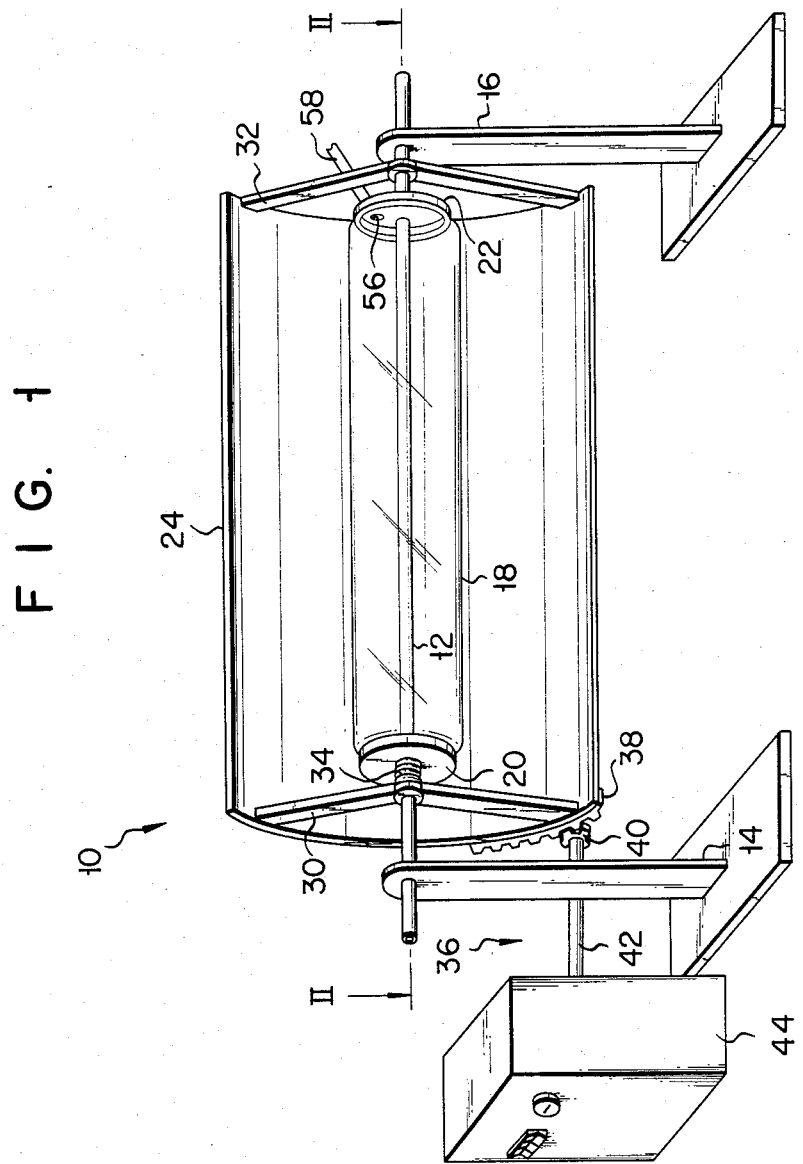
Figure 2:
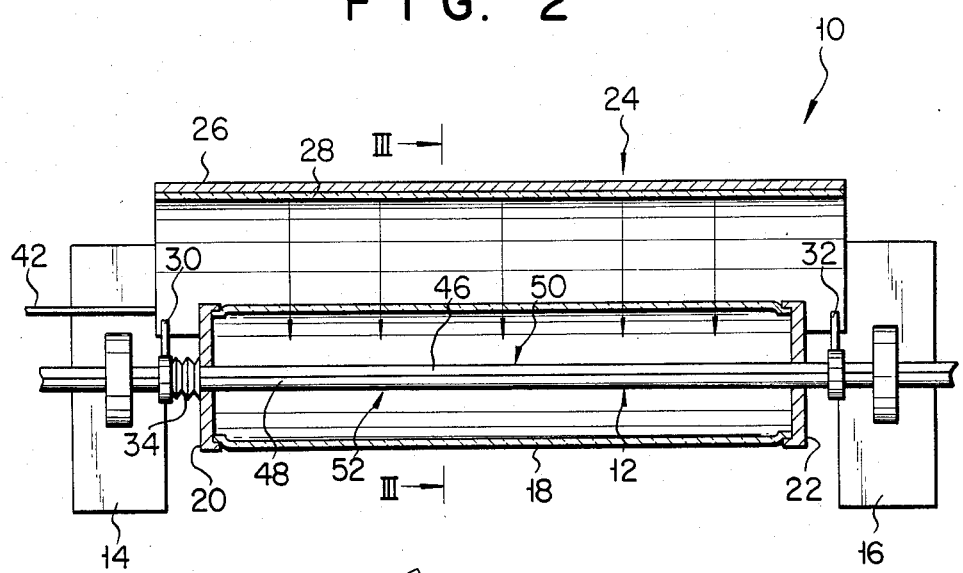
Figure 3:
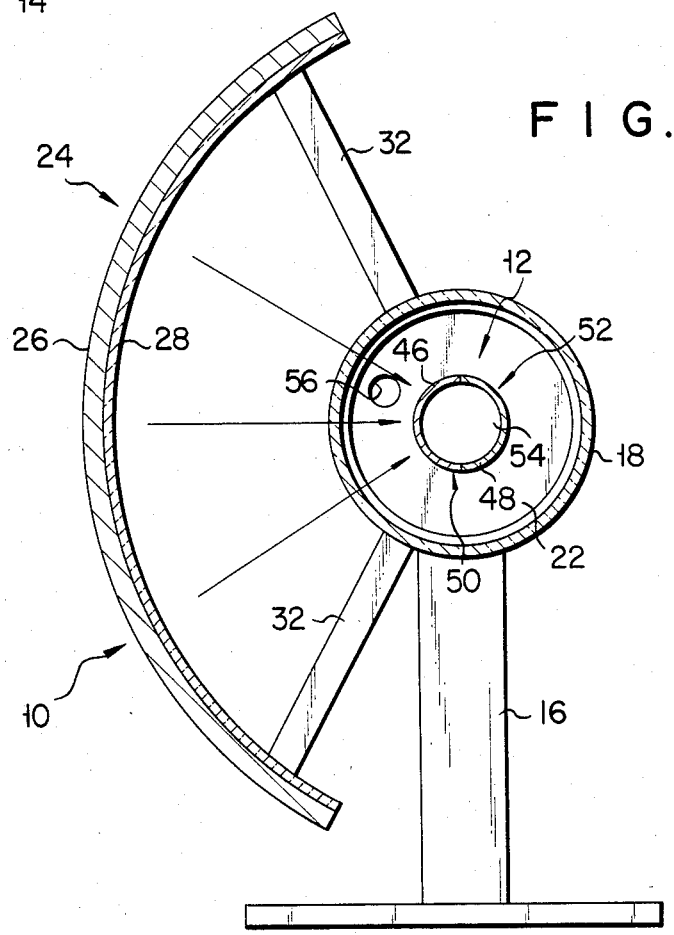

As shown in FIGS. 1 to 3, the heat collector 10 has a cylindrical heat collecting pipe 12 arranged along a horizontal direction. Both ends of the pipe 12 are rotatably supported by supporting frames 14 and 16. The center portion of the pipe 12 is disposed in a glass cylinder 18 which is made of hard glass. The glass cylinder 18 is arranged coaxially with the pipe 12, and both ends of the cylinder 18 are hermetically sealed with caps 20 and 22. The cylinder 18 is evacuated in vacuum. The pipe 12 is extended hermetically through the caps 20 and 22.

The heat collector 10 has as light focusing means for focusing solar light on the pipe 12 a reflecting plate 24. The plate 24 has a longitudinal length substantially equal to the cylinder 18, is arranged along the axial direction of the pipe 12 and hence along a horizontal direction, and is arranged to face the pipe 12. The plate 24 has, as evidently seen from FIG. 3, a base plate 26 and a mirror 28 which is mounted on the base plate 26 and which faces the pipe 12. The plate 24 is parabolically bent corresponding to the pipe 12, and solar light reflected by the mirror 28 is collected to the outer peripheral surface of the pipe 12. This plate 24 is mounted at both its horizontally opposite edges on the pipe 12 through supporting arms 30 and 32, respectively, and is rotatably provided integral with the pipe 12 around the pipe 12 as a center. Bellows 34 are arranged around the pipe 12 between the arm 30 and the cap 20 of the cylinder 18. The bellows 34 absorb the axial thermal expansion and contraction of the cylinder 18 and pipe 12.

The heat collector 10 has tracking means 36 which allows the plate 24 and the pipe 12 to rotatably track the movement of the sun. The means 36 has, as better seen from FIG. 1, a rack 38 which is secured to the back surface of the base plate 26, and a pinion 40 which is engaged with the rack 38. The pinion 40 is connected to driving means 44 through a shaft 42. The means 44 has a reversibly rotatable motor (not shown), and the plate 24 and the pipe 12 are rotated around the axis of the pipe 12 by rotating the pinion 40 by the motor. The pipe 12 is also simultaneously rotated by the motor.

On the other hand, the pipe 12 has, as shown in FIGS. 2 and 3, first and second half pipes 46 and 48 of semicircular cross section. The pipes 46 and 48 are bonded by welding to form a cylindrical pipe 12. The first pipe 46 is disposed to face the plate 24, and is heated upon receiving the solar light reflacted by the plate 24. The second pipe 48 is heated upon receiving of direct solar light. The pipes 46 and 48 respectively form first and second tubular portions 50 and 52. As described above, the pipe 12 is rotated integrally with the plate 24. Accordingly, the half pipe 46 is always disposed to face the plate 24. The first and second half pipes 46 and 48 are formed of metal materials having different thermal expansion coefficients from each other. The pipe 48 is formed of metal having a thermal expansion coefficient larger than that of the first pipe 46. Particularly, the metal materials which satisfy the relation represented by the following equation are employed:

$$T_1/T_2 = \alpha_2/\alpha_1 = C \tag{1}$$

where $\alpha_1$, $\alpha_2$ respectively represent thermal expansion coefficients of the metal materials used for the pipes 46, and 48, $T_1$, $T_2$ respectively represent the heating temperatures of the first and second pipes, and C represents a constant.

In the embodiment described above, the pipe 46 is formed of stainless steel (SUS 410), and the pipe 48 is formed of stainless steel (SUS 304). On the outer surface of the pipe 12 in the cylinder 18 is formed a selective absorption film (not shown) which is, for example, formed of chromium oxide. This film absorbs the solar light and blocks the heat radiated from the pipe 12. On the other hand, the pipe 12 has a passage 54 which is defined by the inner peripheral surface of the pipe 12. Through the passage 54 heating medium such as water or silicone oil (not shown) is flowed, and the heat of the pipe 12 is transferred to the heating medium.

In FIGS. 1 and 3, reference numeral 56 designates an exhaust port formed at the cap 22, and 58 an exhaust tube which is connected to the port 56. The tube 58 is connected to a vacuum pump (not shown) when the cylinder 18 is evacuated, and is sealed after the cylinder 18 is evacuated in a predetermined vacuum degree.

The operation and the advantages of the heat collector 10 thus constructed as described above will now be described.

The pipe 46 is heated upon receiving the solar light reflected by the plate 24. The pipe 48 is heated upon receiving of direct solar light. The pipe 46 becomes a temperature higher than the pipe 48, and temperature difference is produced between the pipes 46 and 48. The pipes 46 and 48 are expanded upon heating. The quantities $\Delta L_1$ and $\Delta L_2$ of variations in the thermal expansion per unit length of the pipes 46 and 48 respectively become as represented by the following equations:

$$\Delta L_1 = \alpha_1 \cdot T_1 \tag{2}$$

$$\Delta L_2 = \alpha_2 \cdot T_2 \tag{3}$$

where $T_1$ and $T_2$ respectively represent the heating temperatures of the pipes 46 and 48 when the heating medium passed through the pipe 12. Therefore, the above equations can be modified as below:

$$\frac{\Delta L_1}{\Delta L_2} = \frac{\alpha_1 \cdot T_1}{\alpha_2 \cdot T_2} \tag{4}$$

$\alpha_1 = \alpha_2/C$ and $T_1 = T_2 \cdot C$ from the equation (1) are substituted in the equation (4), and are arranged as in the following equation:

$$\frac{\Delta L_1}{\Delta L_2} = \frac{\alpha_2/C \cdot T_2 C}{\alpha_2 \cdot T_2} = 1 \tag{5}$$

In this manner, even if a temperature difference is produced between the first half pipe 46 and the second half pipe 48, the quantities $\Delta L_1$ and $\Delta L_2$ of the variations in the thermal expansions of the pipes 46 and 48 become equal to each other as is evident from the equation (5). Therefore, no thermal expansion difference is produced between the first pipe 46 and the second pipe 48, and the pipe 12 is not bent. Therefore, according to this heat collector 10, the solar light reflected by the plate 24 can be effectively focused on the pipe 12, resulting in high heat collecting efficiency. Further damage to the cylinder 18 due to bending of the pipe 12 can also be prevented.

The abovementioned embodiment is described for illustration only to explain the present invention. The present invention is not limited to the particular embodiment described above. Various changes and modifications may be made within the spirit and scope of the present invention. For example, the pipe 12 need not be limited to a cylindrical shape, but may also be a flat tubular shape as shown in FIG. 4.

As shown in FIGS. 5 and 6, the pipe 12 may has a cylindrical tubular body 56 formed of single metal material, and a bend prevention unit 58 mounted in the body 56. The unit 58 includes a first metal piece 60 which is attached to the inner surface of the tubular wall faced with the plate 24 of the body 56 and extends along the axial direction of the body, and a second metal piece 62 which is attached to the inner surface of the tubular wall facing the sun of the body and extends along the axial direction of the body. The pieces 60 and 62 are connected through a plurality of posts 64 to each other. The tubular wall facing the plate 24 of the body 56 and the piece 60 form the first tubular portion 50 which receives the solar light collected by the reflecting plate, and the tubular wall facing the sun of the body and the second piece 62 form the second tubular portion 52 which receives direct solar light. The thermal expansion coefficients $\alpha_1$, $\alpha_2$ of the pieces 60 and 62 are respectively set to satisfy the relation represented by the equation (1). Therefore, even if the tubular portions 50 and 52 are heated by the solar light and a temperature difference is produced between the tubular portions 50 and 52, the unit 58 thermally expand rectilinearly. Accordingly, bending of the pipe 12 can be prevented in the same manner as in the above embodiment.

The light focusing means is not limited to the reflecting plate, but may employ a condensing lens. Further, this heat collector may be used even if the collector does not has the glass cylinder. In addition, in the embodiment described above, the pipe and the reflecting plate are extended horizontally, in a so-called "an east-to-west extension type heat collector", but the heat collector of the present invention may also be applied to a north-to-south extension type heat collector.

Figure 7:
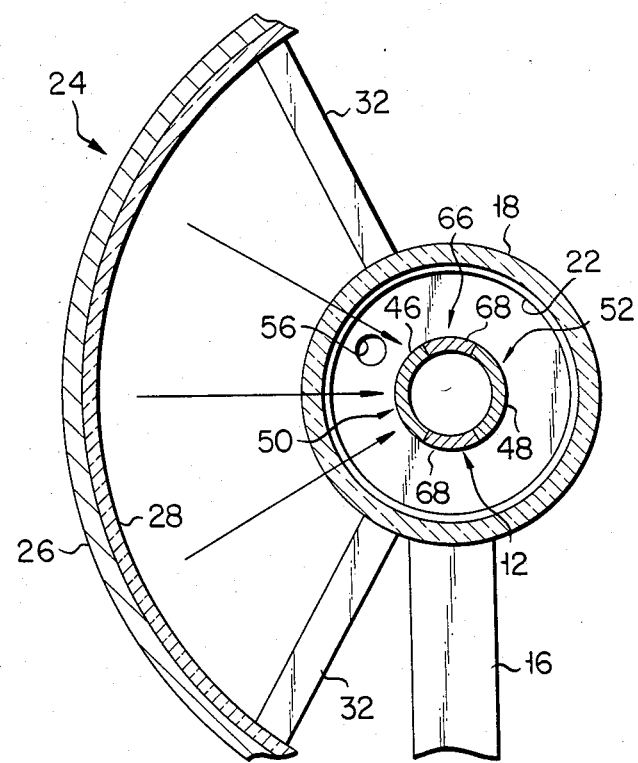
FIG. 7 is a cross sectional view showing still another modified example of the pipe.

As shown in FIG. 7, the heat collecting pipe 12 may have a first tubular portion 50 receiving solar light reflected by the reflecting plate 24, a second tubular portion 52 receiving direct solar light, and a pair of third tubular portions 66 receiving solar light reflected by the reflecting plate and direct solar light. The first, second and third tubular portions 50, 52 and 66 respectively have first, second and third broken pipes 46, 48 and 68 of fan-shaped cross section. These broken pipes 46, 48 and 68 are bonded by welding one another to form a cylindrical pipe 12. Each third pipe 68 is located between the first and second pipes 46 and 48. The pipes 46, 48 and 68 are formed of metal materials having different thermal expansion coefficients from one another. Particularly, the metal materials which satisfy the relation represented by the following equations are employed:

$$T_1/T_2 = \alpha_2/\alpha_1 = C, \ \alpha_1 < \alpha_3 < \alpha_2$$

where $\alpha_1$, $\alpha_2$ and $\alpha_3$ respectively represent thermal expansion coefficients of the metal materials used for the pipes 46, 48 and 68, $T_1$ and $T_2$ respectively represent the heating themperatures of the first and second pipes, and C represents a constant.

What we claim is:

1. A heat collector for a sun utilization system comprising:
   light concentrating means for concentrating solar light to an area of maximum concentration; and
   a heat collecting means for allowing a heating medium to flow therethrough including bend preventing means defined by a first arcuate portion heated by solar light concentrated to said area of maximum concentration by the light concentration means and a second arcuate portion heated by direct solar light, the first and second arcuate portions are respectively formed of metal materials having different thermal expansion coefficients, whereby the first and second arcuate portions thermally expand at the same rate to prevent said pipe from bending.

2. The heat collector according to claim 1, wherein said first arcuate portion is made up of a first half pipe, the second arcuate portion is made up of a second half pipe, the first and second half pipes being welded to each other to form the heat collection means, the thermal expansion coefficients of the first and second half pipes being selected to satisfy the relation represented by the following equation $$T_1/T_2 = \alpha_2/\alpha_1 = C$$

wherein $\alpha_1$ and $\alpha_2$ respectively represent the thermal expansion coefficients of the first and second half pipes, $T_1$ and $T_2$ respectively represent the heating temperatures of the first and second half pipes, and C represents a constant.

3. The heat collector according to claim 2, wherein said first and second half pipes respectively define a semicircular cross section.

4. The heat collector according to claim 3, wherein said heat collecting pipe includes a passage defined by inner peripheral surfaces of the first and second half pipes and allows a heating medium to flow therethrough.

5. The heat collector according to claim 1, wherein said heat collecting means includes a tubular body and a bend prevention means inserted into the tubular body, the means having a first metal piece secured to the inner surface of the tubular wall facing the light collecting means in the tubular body extending along the axial direction of said tubular body, and forming the first arcuate portion together with the tubular wall at the side of the light collecting means, a second metal piece being secured to the inner surface of the tubular wall facing the sun in the tubular body extending along the axial direction of the tubular body, and forming the second arcuate portion together with the tubular wall at the side of the sun, and a plurality of posts for connecting the first and second metal pieces to each other, the first and second metal pieces respectively have different thermal expansion coefficients, and the thermal expansion coefficients of the first and second metal pieces are set to satisfy the relation represented by the following equation $$T_1/T_2 = \alpha_2/\alpha_1 = C$$

where $\alpha_1$ and $\alpha_2$ respectively represent the thermal expansion coefficients of the first and second metal pieces, $T_1$ and $T_2$ respectively represent the heating temperatures of the first and second tubular portions and C represents a constant.

6. The heat collector according to claim 5, wherein said heat collecting means includes a passage which is defined by the inner peripheral surface of the tubular body and allows a heating medium to flow therethrough.

7. The heat collector according to claim 1, wherein said light collecting means includes a reflecting plate axially extending along the heat collecting means and provided to face the first arcuate portion for reflecting solar light to focus the solar light on the first arcuate portion.

8. The heat collector according to claim 7, wherein said reflecting plate has supporting arms rigidly mounted on the heat collecting means, and is mounted on the heat collecting means by the arms, and the reflecting plate and the heat collecting means are rotatably and integrally arranged around an axis of the heat collecting means as a center so that the first portion is always positioned in said area of maximum concentration.

9. The heat collector according to claim 8, which further comprises a supporting frame for rotatably supporting the heat collecting means, and tracking means for allowing the heat collecting means and the reflecting plate to rotatably track the movement of the sun.

10. The heat collector according to claim 1, which further comprises a glass cylinder mounted coaxially with the heat collecting means to cover the heat collecting means and defining an evacuated space between the glass cylinder and the heat collecting means for suppressing heat from radiating from the heat collecting means.

11. The heat collector according to claim 1, wherein said heat collecting means includes third and fourth arcuate portions receiving solar light collected by the light collecting means and direct solar light, the third and fourth arcuate portions having a thermal expansion coefficient larger than that of the first arcuate portion and smaller than that of the second arcuate portion.

12. The heat collector according to claim 11, wherein said first, second, third and fourth arcuate portions each respectively have first, second, third and fourth fan-shaped cross sections, which are welded to one another to form the heat collecting means, the third and fourth arcuate sections are each respectively located between the first and second arcuate portions, the first and second arcuate portions respectively formed of metal materials having different thermal expansion coefficients, the third and fourth arcuate portions are formed of the same metal materials and the thermal expansion coefficients are set to satisfy the relation represented by the following equation $$T_1/T_2 = \alpha_2/\alpha_1 = C, \alpha_1 < \alpha_3 < \alpha_2$$

where $\alpha_1$ and $\alpha_2$ respectively represent the thermal expansion coefficients of the first and second arcuate portions, $\alpha_3$ represents the thermal expansion coefficient of both the third and fourth arcuate portions, T1 and T2 respectively represent the heating temperatures of the first and second arcuate portions, and C represents a constant.

* * * * *